US 6,564,544 B2

(12) United States Patent
Kakuyama et al.

(10) Patent No.: US 6,564,544 B2
(45) Date of Patent: May 20, 2003

(54) ENGINE EXHAUST PURIFICATION ARRANGEMENT

(75) Inventors: Masatomo Kakuyama, Yokohama (JP); Shigeaki Kakizaki, Yokohama (JP); Osamu Matsuno, Ayase (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/959,405

(22) PCT Filed: Feb. 26, 2001

(86) PCT No.: PCT/JP01/01403
§ 371 (c)(1),
(2), (4) Date: Oct. 24, 2001

(87) PCT Pub. No.: WO01/63109
PCT Pub. Date: Aug. 30, 2001

(65) Prior Publication Data
US 2002/0157381 A1 Oct. 31, 2002

(30) Foreign Application Priority Data
Feb. 25, 2000 (JP) .......................................... 2000-049178

(51) Int. Cl.$^7$ ................................................ F01N 3/00
(52) U.S. Cl. ........................................... 60/285; 60/274
(58) Field of Search ......................... 60/274, 285, 299, 60/276

(56) References Cited

U.S. PATENT DOCUMENTS

| 5,509,267 A | * | 4/1996 | Theis ............................ 60/274 |
| 5,579,637 A | * | 12/1996 | Yamashita et al. ............. 60/276 |
| 5,602,737 A | * | 2/1997 | Sindano et al. ............. 123/674 |
| 5,609,023 A | | 3/1997 | Katoh et al. .................... 60/276 |
| 5,678,402 A | * | 10/1997 | Kitagawa et al. .............. 60/276 |
| 5,839,274 A | * | 11/1998 | Remboski et al. ............. 60/274 |
| 5,842,340 A | | 12/1998 | Bush et al. ..................... 60/274 |
| 5,848,528 A | * | 12/1998 | Liu .............................. 123/696 |
| 5,901,552 A | * | 5/1999 | Schnaibel et al. ............. 60/274 |
| 6,289,673 B1 | | 9/2001 | Tayama et al. ................ 60/825 |
| 6,301,881 B1 | * | 10/2001 | Kumar ......................... 60/274 |
| 6,336,320 B1 | * | 1/2002 | Tanaka et al. ............... 123/443 |

FOREIGN PATENT DOCUMENTS

| EP | 0 885 657 | 12/1998 |
| EP | 0 930 425 | 7/1999 |
| JP | 9-228873 | 9/1997 |
| WO | 95/35152 | 12/1995 |
| WO | 96/41071 | 12/1996 |

* cited by examiner

Primary Examiner—Thomas Denion
Assistant Examiner—Diem Tran
(74) Attorney, Agent, or Firm—Foley & Lardner

(57) ABSTRACT

A controller (6) computes an oxygen storage amount of a catalyst (3) separately as a high speed component/amount and a low speed component/amount according to predetermined release/adsorption characteristics. A target air-fuel ratio of an engine is computed and the air-fuel ratio of the engine is controlled so that the high speed component is maintained constant. The target air-fuel ratio of the engine (1) is limited by an upper limiter and lower limiter so that the high speed component converges to the target value, an excessively large variation of the air-fuel ratio is prevented, and impairment of drivability and fuel cost-performance is also prevented. Further, after lean running due to fuel cut, etc., the lower limiter is lowered to the rich side, and the oxygen storage amount is rapidly induced to converge on the target value.

20 Claims, 13 Drawing Sheets

ENGINE EXHAUST PURIFICATION ARRANGEMENT

FIELD OF THE INVENTION

The present invention relates to an engine exhaust purification arrangement provided with a catalyst and more specifically to a control arrangement for an exhaust gas purification arrangement which maintains the air-fuel ratio in a catalytic converter at stoichiometric using specific oxygen adsorption/release characteristics of the catalyst.

BACKGROUND OF THE INVENTION

JP-A-H9-228873 published by the Japanese Patent Office in 1997 discloses a technique wherein the amount of oxygen stored in a three-way catalyst (hereafter, "oxygen storage amount") is computed based on an engine intake air amount and an air-fuel ratio of an exhaust flowing into the catalyst, and wherein engine air-fuel ratio control is performed so that the oxygen storage amount of the catalyst is maintained essentially constant.

In order to maintain the NOx (nitrogen oxides), CO and HC (hydrocarbon) conversion efficiency of a three-way catalyst at a maximum or optimal level, the catalyst atmosphere must be maintained at the stoichiometric air-fuel ratio. By maintaining the oxygen storage amount of the catalyst constant, oxygen in the exhaust is stored in the catalyst when the air-fuel ratio of the exhaust flowing into the catalyst shifts to lean, and oxygen stored in the catalyst is released when the air-fuel ratio of the exhaust flowing into the catalyst shifts to rich, so the catalyst atmosphere can be assuredly maintained at the stoichiometric air-fuel ratio.

In an exhaust purification arrangement which performs this control, the conversion efficiency of the catalyst depends on the oxygen storage amount of the catalyst. Therefore, to control the oxygen storage amount to the desired constant level and to maintain the conversion efficiency of the catalyst at a high/optimal level, the oxygen storage amount must be precisely computed.

However, this system suffers from the drawback that it has proven difficult to precisely compute the oxygen storage amount of the catalyst using computational methods which have thus far been developed.

SUMMARY OF THE INVENTION

It is believed that this drawback results from the fact that the oxygen is stored and released rapidly by noble metal (platinum Pt, for example) contained in the catalyst, while stored and released slowly by an oxygen storage material such as cerium oxide, and that the amount of oxygen which is stored has not, in the prior art, been computed in a manner which takes this factor into account.

Therefore, as one approach to solving this problem, it is proposed to improve the precision with which the oxygen storage amount is determined by separately computing a high speed component/amount and a low speed component/amount and thus more accurately match the actual adsorption/release characteristics. Additionally, it is proposed to maintain the catalyst atmosphere based primarily on the high speed component and in a manner which maintains the catalyst conversion efficiency at a high-level. This is achieved by controlling the air-fuel ratio of the engine so that the high speed component is kept essentially constant at a target level.

However, if the air-fuel ratio of the exhaust gases, which are emitted from the engine and supplied to the catalyst, is strongly shifted into the lean region when the storage amount of the high speed component is effectively zero, or the engine air-fuel ratio is largely varied to rich when the storage amount of the high speed component has reached its maximum capacity, i.e., if the air-fuel ratio is varied without any restriction to maintain the high speed component constant, drivability and fuel economy decrease. On the other hand, when the oxygen storage capacity of the catalyst is a maximum, the NOx discharge amount tends to increase, and at such times, the oxygen storage amount must be rapidly decreased to the optimum amount.

This invention is therefore directed to controlling the amount of oxygen stored in a catalyst to an appropriate amount with good response so that the air-fuel ratio can be controlled to the degree that the oxygen storage amount of the catalyst is essentially constant while obviating the decrease of drivability and fuel-cost performance due to excessively large variations in the air-fuel ratio.

In order to achieve the above, a first aspect of the invention provides an exhaust purification arrangement for an engine which includes a catalyst provided in an exhaust passage of the engine, a front sensor for sensing the air fuel ratio of the exhaust gases which are flowing to the catalyst and a processor (e.g. microprocessor) arrangement which is responsive to the detected air/fuel ratio. In this arrangement the catalyst contains a material (or materials) which stores oxygen in the form of a high speed component wherein the oxygen is rapidly adsorbed and released from the material and which stores oxygen in the form of a low speed component wherein the oxygen is slowly adsorbed and released from the material. The microprocessor is programmed to compute the high speed oxygen storage amount of the material based on the detected exhaust air-fuel ratio, and to compute the target air-fuel ratio to be supplied to the engine (1) so that the amount of oxygen in the exhaust gas maintains the high speed oxygen storage amount in the material at a predetermined target value which is selected to be able to absorb or releases oxygen as required during transient periods and enables the atmosphere about the catalyst to be maintained at an air-fuel ratio which promotes efficient conversion of noxious compounds.

Another aspect of the invention resides in a method of controlling the air-fuel ratio of an atmosphere in an catalytic converter which is operatively connected with an internal combustion engine, comprising the steps of: storing oxygen on a first material in the catalytic converter which adsorbs and releases oxygen rapidly; storing oxygen on a second material in the catalytic converter which adsorbs and releases oxygen more slowly than the first material; and controlling the air-fuel ratio of the exhaust gas entering the catalytic converter to control the amount of oxygen which is adsorbed on the first material to a predetermined target amount which is less than the maximum amount of oxygen which can be adsorbed onto the first material.

In this method the step of controlling the air-fuel ratio of the exhaust gases can include controlling the air-fuel ratio of the exhaust gases to within upper and lower air-fuel ratio limits; determining if the first material is saturated with oxygen; and temporarily reducing the lower air-fuel ratio limit to enrich the air-fuel mixture to rapidly lower the amount of oxygen stored in the first material toward the target value which, as mentioned above, is selected to be between maximum and minimum amounts of oxygen which can be stored by the first material and thus allow oxygen to be rapidly stored or released from the first material in a manner which enables quick response to fluctuations in the air-fuel ratio of the incoming gases.

A further aspect of the invention resides in an arrangement for controlling the air-fuel ratio of an atmosphere in an catalytic converter which is operatively connected with an internal combustion engine, comprising: a first material disposed in the catalytic converter which adsorbs and releases oxygen rapidly; a second material disposed in the catalytic converter which adsorbs and releases oxygen more slowly than the first material; a control arrangement for controlling the air-fuel ratio of the exhaust gas entering the catalytic converter to adjust the amount of oxygen which is adsorbed on the first material to a target amount which is approximately half of the maximum amount of oxygen which can be adsorbed onto the first material.

The control arrangement in this case is also capable of executing the steps set forth above, so that should the first material become saturated with oxygen due to a temporary leaning of the air-fuel ratio such as results from no fuel being supplied to selected cylinders of the engine during so called "fuel cut" modes of operation, and additionally enriched air fuel mixture can be supplied to rapidly reduce the amount of oxygen stored on the first material toward the target amount.

The details as well as other features and advantages of this invention are set forth in the remainder of the specification and are shown in the accompanying drawings.

In more detail, noble metals adsorb oxygen in the molecular state, while oxygen storage materials absorb oxygen as compounds, but in the following description, adsorption and absorption will be collectively referred to as storage. Further, the expression "the exhaust air-fuel ratio is rich" will be used throughout the specification to refer to the situation wherein the oxygen concentration in the exhaust is lower than the oxygen concentration in the exhaust when the engine is running at the stoichiometric air-fuel ratio, while the expression "the exhaust air-fuel ratio is lean" will be used to denote the situation wherein the oxygen concentration in the exhaust is higher than the oxygen concentration when the engine is running at the stoichiometric air-fuel ratio. The expression "the exhaust air-fuel ratio is stoichiometric" will be used to indicate that the oxygen concentration in the exhaust is equal to the oxygen concentration of the exhaust when the engine is running at the stoichiometric air-fuel ratio.

DESCRIPTION OF THE PREFERRED EMBODIMENTS

Figure 1:
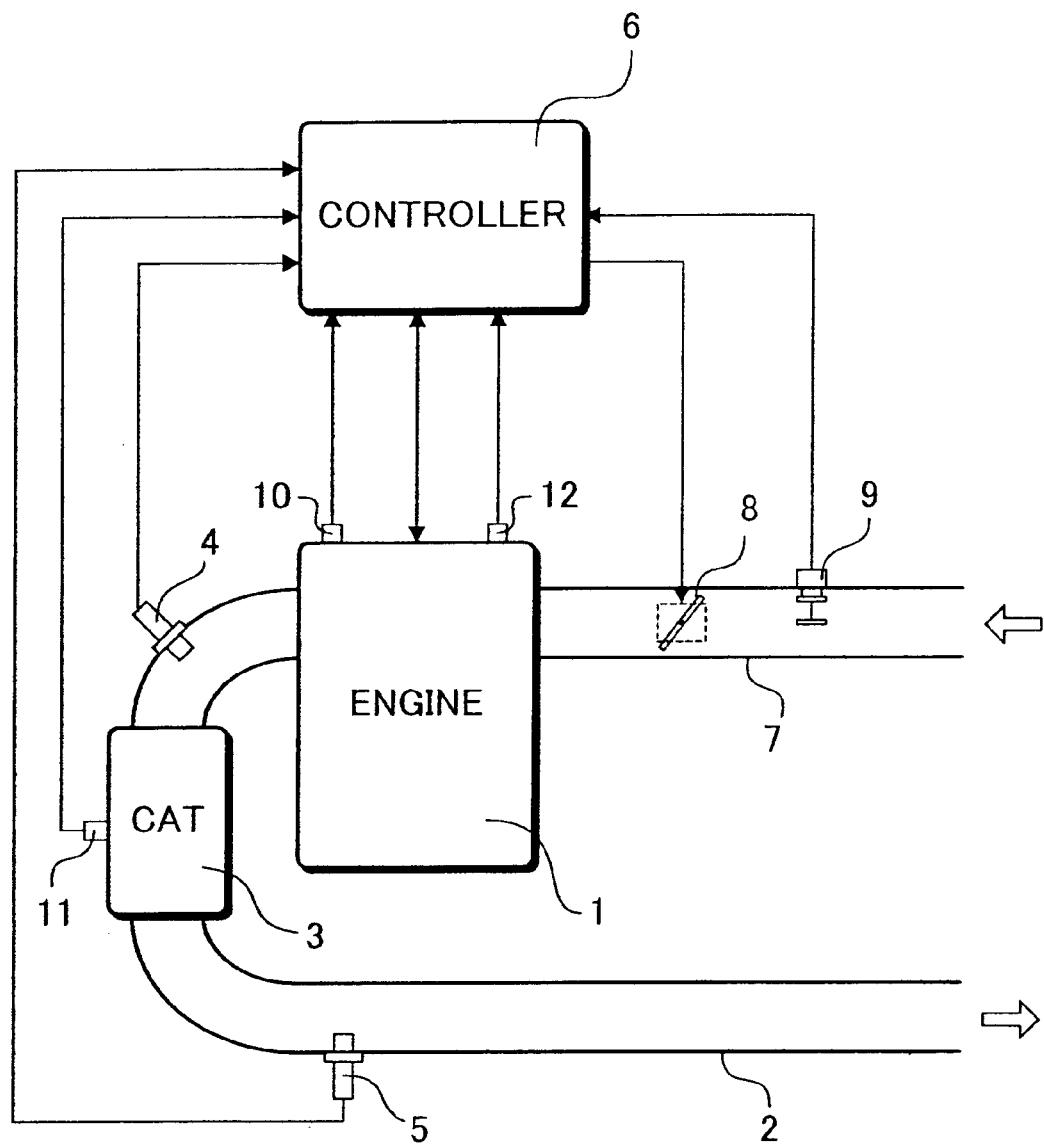
FIG. 1 is a schematic diagram of an exhaust purification arrangement according to this invention.

Referring to FIG. 1 of the drawings, an exhaust passage 2 of an engine 1 includes a catalytic converter containing a catalyst 3, a front, wide range air-fuel ratio sensor 4 (hereafter referred to as front A/F sensor), rear oxygen sensor 5 and controller 6.

A throttle 8, and an air flow meter 9 which detects the intake air amount adjusted by the throttle 8, are disposed in an intake passage 7 of the engine 1. In addition, a crank angle sensor 12 which detects the engine rotation speed of the engine 1 is provided.

Figure 13:
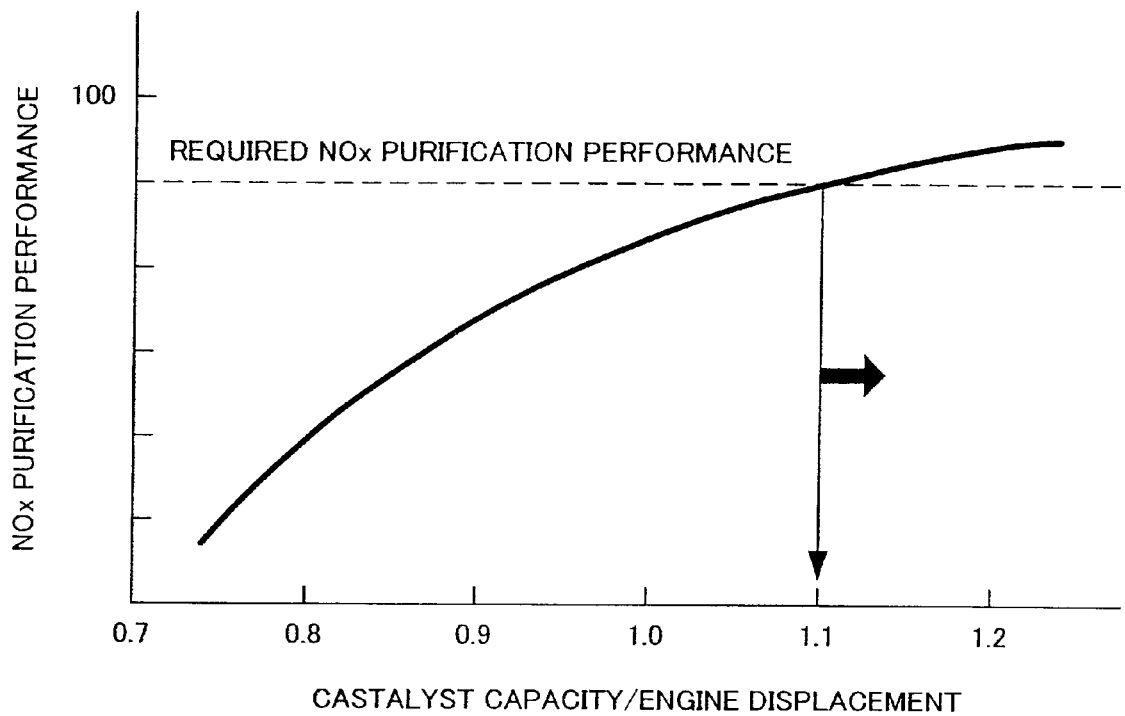
FIG. 13 is a drawing showing the effect of the ratio of the catalyst capacity and engine displacement on NOx purification performance.

The catalyst 3 included in the catalytic converter is of the type having the so called "three-way" catalytic function which purifies NOx, HC and CO with maximum efficiency when the atmosphere surrounding the catalyst is at the stoichiometric air-fuel ratio. The carrier on which the catalyst is supported is coated with an oxygen storage material such as cerium oxide, while the catalytic material itself includes an oxygen storage/release function which is controlled by the air-fuel ratio of the inflowing exhaust (referred to hereafter as oxygen storage function). The capacity of the catalyst 3 is set to at least 1.1 times the total displacement of the engine cylinders connected by the exhaust passage 2. The selection of the capacity of the catalyst in the converter 3 in this way is because the required NOx purification performance is thereby obtained as shown in FIG. 13. When more than one catalyst is provided upstream of the rear oxygen sensor 5, the sum of catalyst capacity is determined so that it is 1.1 times the total displacement of the engine cylinders.

The oxygen storage amount of the catalyst 3 may be considered as being partitioned into a high speed component HO2 which is stored and released by a noble metal in the catalyst 3 (Pt, Rh, Pd), and a low speed component LO2 which is stored and released by the oxygen storage material in the catalyst 3. The low speed component LO2 represents the storage and release of a larger amount of oxygen than the high speed component HO2, however, its storage/release rate is slower than that of the high speed component HO2.

Further, the high speed component HO2 and low speed component LO2 have the following characteristics:

When oxygen is stored, it is stored preferentially as the high speed component HO2, and begins to be stored as the low speed component LO2 only when the high speed component HO2 has reached its maximum capacity HO2MAX and can no longer be stored.

When oxygen is released, and the ratio of the low speed component LO2 to the high speed component HO2 (LO2/HO2) is less than a predetermined value, i.e. when the high speed component is relatively large, oxygen is preferentially released from the high speed component HO2, and when the ratio of the low speed component LO2 to the high speed component is greater than the predetermined value, oxygen is released from both the high speed component HO2 and low speed component LO2 so that the ratio of the low speed component LO2 to the high speed component becomes essentially constant and does not vary.

Figure 2:
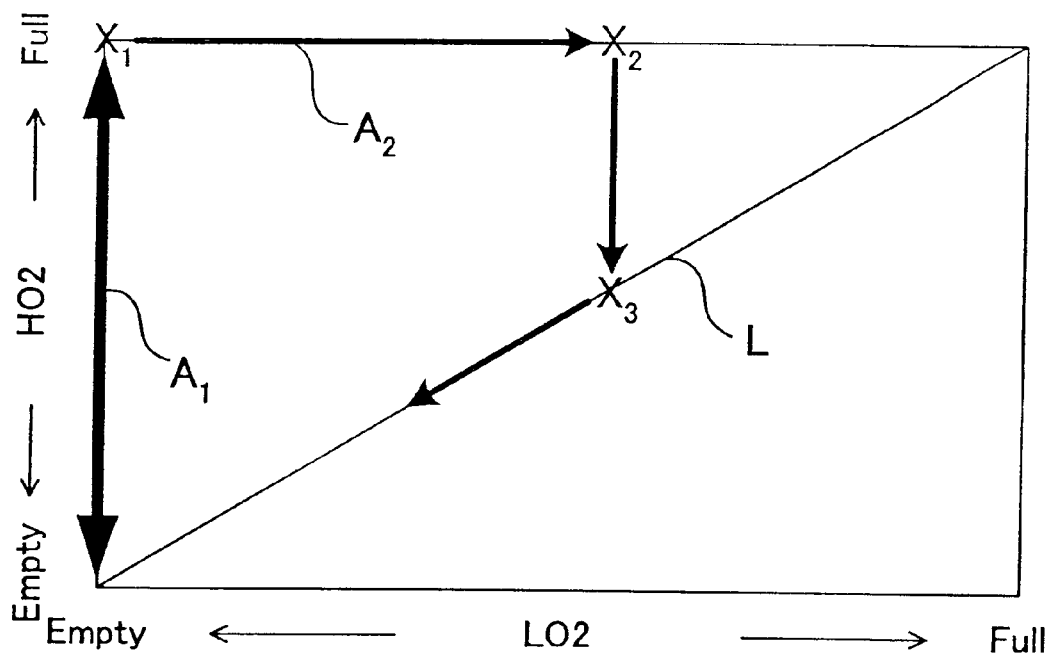
FIG. 2 is a diagram showing the oxygen release characteristics of a catalyst.

FIG. 2 shows the oxygen storage/release characteristics of the catalyst. The vertical axis shows the high speed component HO2 (oxygen amount stored on the noble metal) and the horizontal axis shows the low speed component LO2 (oxygen stored in the oxygen storage material).

Under normal running conditions, the low speed component LO2 is almost zero and only the high speed component HO2 varies according to the air-fuel ratio of the exhaust flowing into the catalyst as shown by arrow $A_1$ in FIG. 2. The high speed component HO2 is normally controlled, for example, to be half of its maximum capacity.

However, when an engine "fuel-cut" is performed or when the engine has restarted from a warmed-up state (i.e. a hot restart), the high speed component HO2 reaches a maximum value and oxygen is then stored as the low speed component LO2 (see arrow $A_2$ in FIG. 2). the oxygen storage amount varies from the point $X_1$ to the point $X_2$.

When oxygen is released at point $X_2$, it is preferentially released in the form of the high speed component HOSCn. When the ratio of the low speed component LOSCn to the high speed component HOSCn (viz., LOSCn/HOSCn) reaches the predetermined value ($X_3$ in FIG. 11), oxygen is released from both the noble metal and the oxygen storage material in the form of both high speed and low speed components LOSCn, HOSCn in a manner wherein the ratio of the low speed component to the high speed component does not vary. That is to say, oxygen is released in accordance with the straight line trace L. In this instance, the trace L depicts a situation wherein the ratio of the low speed component to the high speed component is 5~15 (preferably 10):1.

Returning to FIG. 1, the front A/F sensor 4 provided upstream of the catalyst 3 detects the air-fuel ratio of the exhaust flowing into the catalyst 3, and outputs a voltage in proportion to the exhaust air-fuel ratio. The rear oxygen sensor 5 provided downstream of the catalyst 3 detects whether the exhaust air-fuel ratio downstream of the catalyst 3 is richer or leaner than the stoichiometric air-fuel ratio. In this instance, a relatively inexpensive oxygen sensor (c.f. the air-fuel ratio sensor 4) is provided downstream of the catalyst 3. However, a more expensive/sensitive A/F sensor can be provided instead if so desired.

In addition, a cooling water temperature sensor 10 which detects the temperature of the cooling water is also fitted to the engine 1. The detected cooling water temperature is used for determining the running state of the engine 1, and also for estimating the temperature of the catalyst 3.

The controller 6 comprises at least one microprocessor, typically including a RAM, a ROM, and an I/O interface. The controller 6 computes the oxygen storage amount of the catalyst 3 (high speed component HO2 and low speed component LO2) based on the output of the air flow meter 9, front A/F sensor 4 and cooling water temperature sensor 10.

When the high speed component HO2 of the computed oxygen storage amount is greater than a predetermined amount (e.g., half the maximum capacity HO2MAX of the high speed component), the controller 6 is arranged to render the air-fuel ratio of the engine 1 rich, and thus decreases the high speed component HO2. Conversely, when the amount of high speed oxygen (HO2) which is stored, is determined to be less than the predetermined amount, the controller 6 adjusts the air-fuel ratio of the engine 1 to the lean side of the stoichiometric ratio and thus increases the amount of oxygen which is available for adsorption and accordingly increases the amount of the high speed oxygen component HO2. This type of control enables the high speed stored oxygen component HO2 to be maintained essentially constant.

However, as the computations continue over prolong periods, computational values tend to drift and discrepancies can arise between the computed amount of oxygen which is stored and the actual amount which is in fact stored. In order to compensate/correct for this error, the controller 6 resets the computational value of the oxygen storage amount at predetermined time intervals based on the sensed air-fuel ratio of the exhaust downstream of the catalyst 3, and corrects for this discrepancy in the real oxygen storage amount.

More specifically, when it is determined by the rear oxygen sensor 5 that the air-fuel ratio of the exhaust flowing from the catalyst 3 is lean, it is assumed that at least the high speed component HO2 is at a maximum, and the high speed component HO2 is reset to reflect a maximum capacity. When it is determined by the rear oxygen sensor 5 that the air-fuel ratio of the exhaust flowing from the catalyst 3 is rich, it is assumed that oxygen is no longer being released not only from the high speed component HO2 but also from the low speed component LO2, so the high speed component HO2 and low speed component LO2 are reset to reflect a minimum capacity status.

Next, the control performed by the controller 6 will be described.

First, the computation of the oxygen storage amount will be described. This will be followed by resetting of the computational value of the oxygen storage amount, and air-fuel ratio control of the engine 1 based on the oxygen storage amount.

Figure 3:
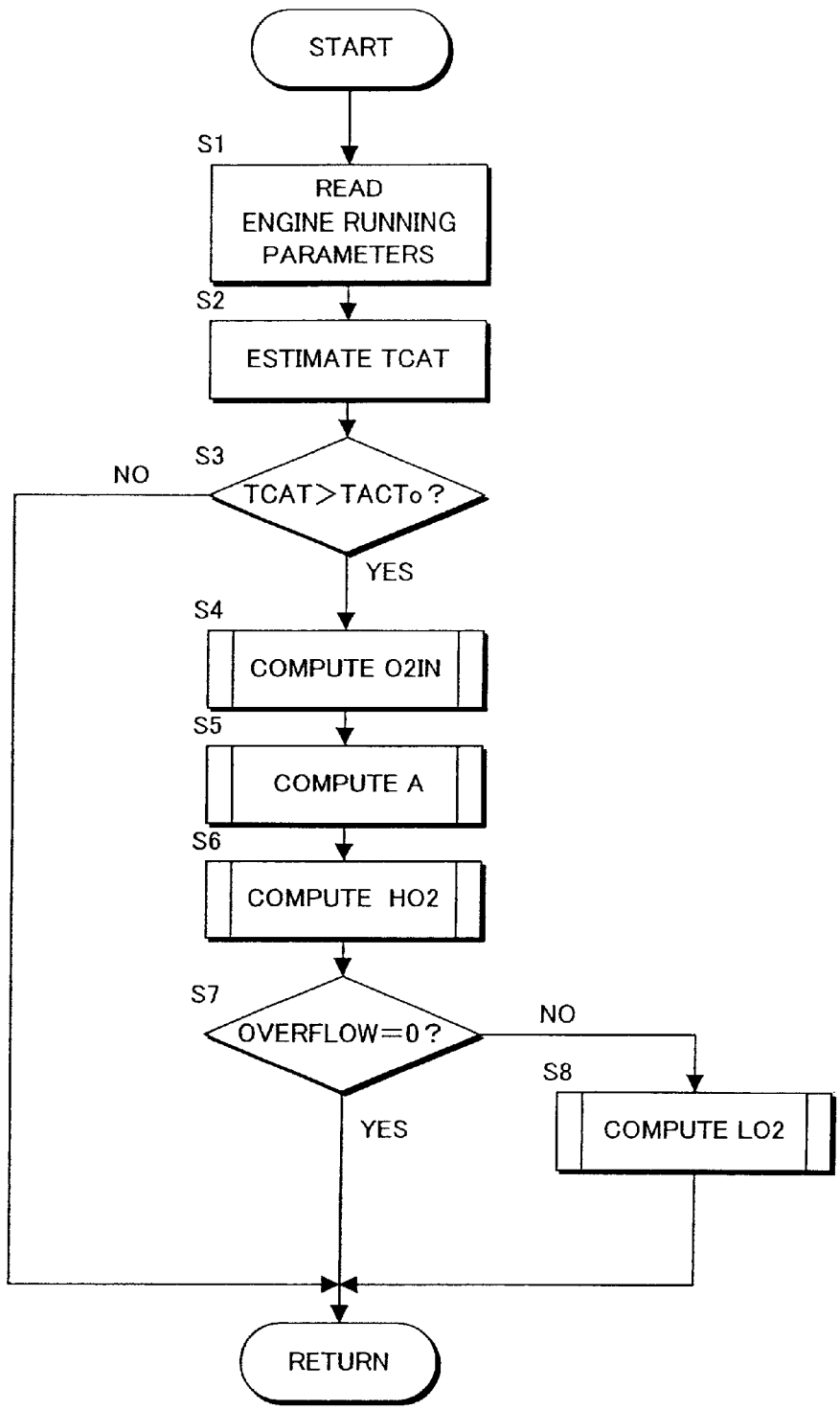
FIG. 3 is a flowchart showing a routine for computing an oxygen storage amount of the catalyst.

FIG. 3 shows a routine for computing the oxygen storage amount stored on/in the catalyst 3. This routine is performed at predetermined intervals in the controller 6.

First, in step S1, the outputs of the cooling water temperature sensor 10, crank angle sensor 12 and air flow meter 9 are read as running/operational parameters of the engine 1. In step S2, a temperature TCAT of the catalyst 3 is estimated based on one more of these parameters. In step S3, by comparing the estimated catalyst temperature TCAT and a catalyst activation temperature TACTo (e.g. 300° C.), is determined whether or not the catalyst 3 has become active or not.

When it is determined that the catalyst activation temperature TACTo is reached, the routine proceeds to step S4 to compute the oxygen storage amount of the catalyst 3. When it is determined that the catalyst activation temperature TACTo has not been reached, it is assumed that the catalyst 3 is neither storing nor releasing oxygen, so processing is terminated.

In step S4, a subroutine (FIG. 4) for computing an oxygen excess/deficiency amount O2IN is performed, and the oxygen excess/deficiency amount of the exhaust flowing into the catalyst 3 is computed. In step S5, a subroutine (FIG. 5) for computing an oxygen release rate A of the high speed component of the oxygen storage amount is performed, and the oxygen release rate A of the high speed component is computed.

Further, in step S6, the subroutine (FIG. 6) for computing the high speed component HO2 of the oxygen storage amount is performed, and the high speed component HO2 and an oxygen amount OVERFLOW which is overflowing into the low speed component LO2 without being stored as the high speed component HO2, are computed based on the oxygen excess/deficiency amount O2IN and the oxygen release rate A of the high speed component.

In step S7, it is determined whether or not all of the oxygen excess/deficiency amount O2IN flowing into the catalyst 3 has been stored as the high speed component HO2 based on the overflow oxygen amount OVERFLOW. When all of the excess/deficiency amount O2IN is stored as the high speed component, i.e., when OVERFLOW is zero, processing is terminated. However, in other cases, the routine proceeds to step S8, a subroutine (FIG. 7) is performed for computing the low speed component LO2, wherein the low speed component LO2 is computed based on the overflow oxygen amount OVERFLOW overflowing from the high speed component HO2.

In this instance, the catalyst temperature TCAT is estimated from the cooling water temperature of the engine 1, the engine load and the engine rotation speed. However, the invention is not so limited and it is possible to dispose a temperature sensor 11 with the catalyst 3, as shown in FIG. 1, to enable the temperature of the catalyst 3 to be measured directly.

When the catalyst temperature TCAT is less than the activation temperature TACTo, the oxygen storage amount is not computed, and steps S4–S8 are by-passed, and the effect of the catalyst temperature TCAT may be reflected in the oxygen release rate A of the high speed component or an oxygen storage/release rate B of the low speed component, in the manner set forth later.

Next, the subroutine performed in steps S4 to S6 and in step S8 will be described.

Figure 4:
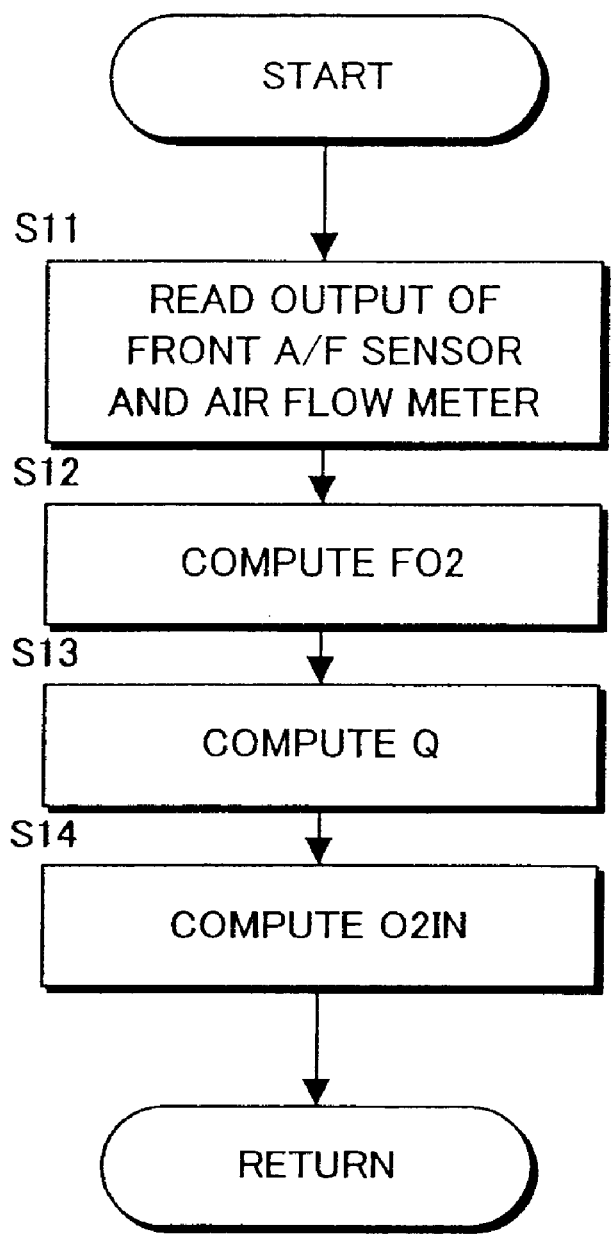
FIG. 4 is a flowchart showing a subroutine for computing an overflow oxygen amount of the exhaust flowing into the catalyst.

FIG. 4 shows the subroutine for computing the oxygen excess/deficiency amount O2IN of the exhaust flowing into the catalyst 3. In this subroutine, the oxygen excess/deficiency amount O2IN of the exhaust flowing into the catalyst 3 is computed based on the air-fuel ratio of the exhaust upstream of the catalyst 3 and the intake air amount of the engine 1.

First, in step S11, the output of the front A/F sensor 4 and the output of the air flow meter 9 are read.

Next, in step S12, the output of the front A/F sensor 4 is converted to an excess/deficiency oxygen concentration FO2 of the exhaust flowing into the catalyst 3 using a predetermined conversion table. Here, the excess/deficiency oxygen concentration FO2 is a relative concentration based on the oxygen concentration at the stoichiometric air-fuel ratio. If the exhaust air-fuel ratio is equal to the stoichiometric air-fuel ratio, it is zero, if it is richer than the stoichiometric air-fuel ratio it has a negative value, and if it is leaner than the stoichiometric air-fuel ratio, it has a positive value.

In step S13, the output of the air flow meter 9 is converted to an intake air amount Q×t using a predetermined conversion table wherein Q=exhaust gas flow rate represented by intake air flow rate, and t=cycle time. In step S14, the intake air amount Q×t which was computed in step S13, is multiplied by the excess/deficiency oxygen concentration FO2 computed in step S12 to compute the excess/deficiency oxygen amount O2IN of the exhaust flowing into the catalyst 3. As the excess/deficiency oxygen concentration FO2 has the above characteristics, the excess/deficiency oxygen amount O2IN is zero when the exhaust flowing into the catalyst 3 is at the stoichiometric air-fuel ratio, a negative value when it is rich, and a positive value when it is lean.

Figure 5:
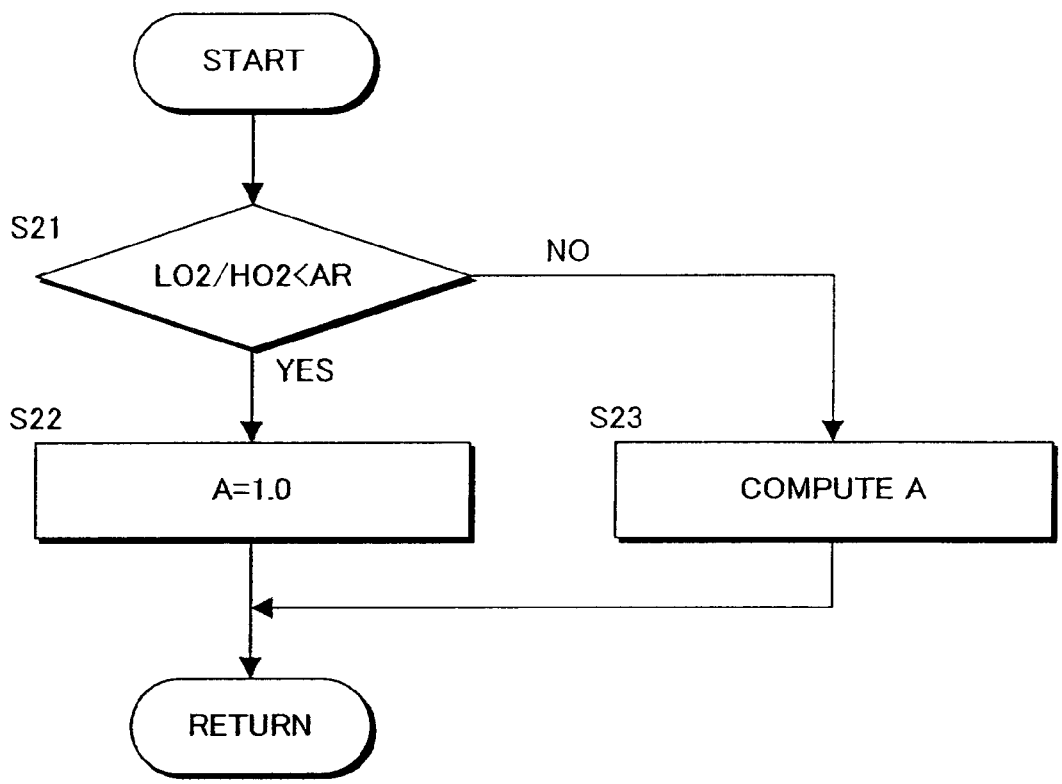
FIG. 5 is a flowchart showing a subroutine for computing an oxygen release rate of a high speed component.

FIG. 5 shows a subroutine for computing the oxygen release rate A of the high speed component of the oxygen storage amount. In this subroutine, as the oxygen release rate of the high speed component HO2 is affected by the low speed component LO2, the oxygen release rate A of the high speed component is computed according to the low speed component LO2.

First, in step S21, it is determined whether or not a ratio LO2/HO2 of low speed component relative to high speed component is less than a predetermined value AR (e.g. AR=10).

In the event that it is determined that the ratio LO2/HO2 is less than the predetermined value AR, i.e., when the high speed component HO2 is relatively larger than the low speed component LO2, the routine proceeds to step S22, and the oxygen release rate A of the high speed component is set to 1.0 expressing the fact that oxygen is released first from the high speed component HO2.

On the other hand, when it is determined that the ratio LO2/HO2 is not less than the predetermined value AR, oxygen is released from the high speed component HO2 and the low speed component LO2 so that the ratio of the low speed component LO2 to the high speed component HO2 does not vary. The routine then proceeds to step S23, and the value of the oxygen release rate A of the high speed component is computed on the basis that the ratio LO2/HO2 does not vary.

Figure 6:
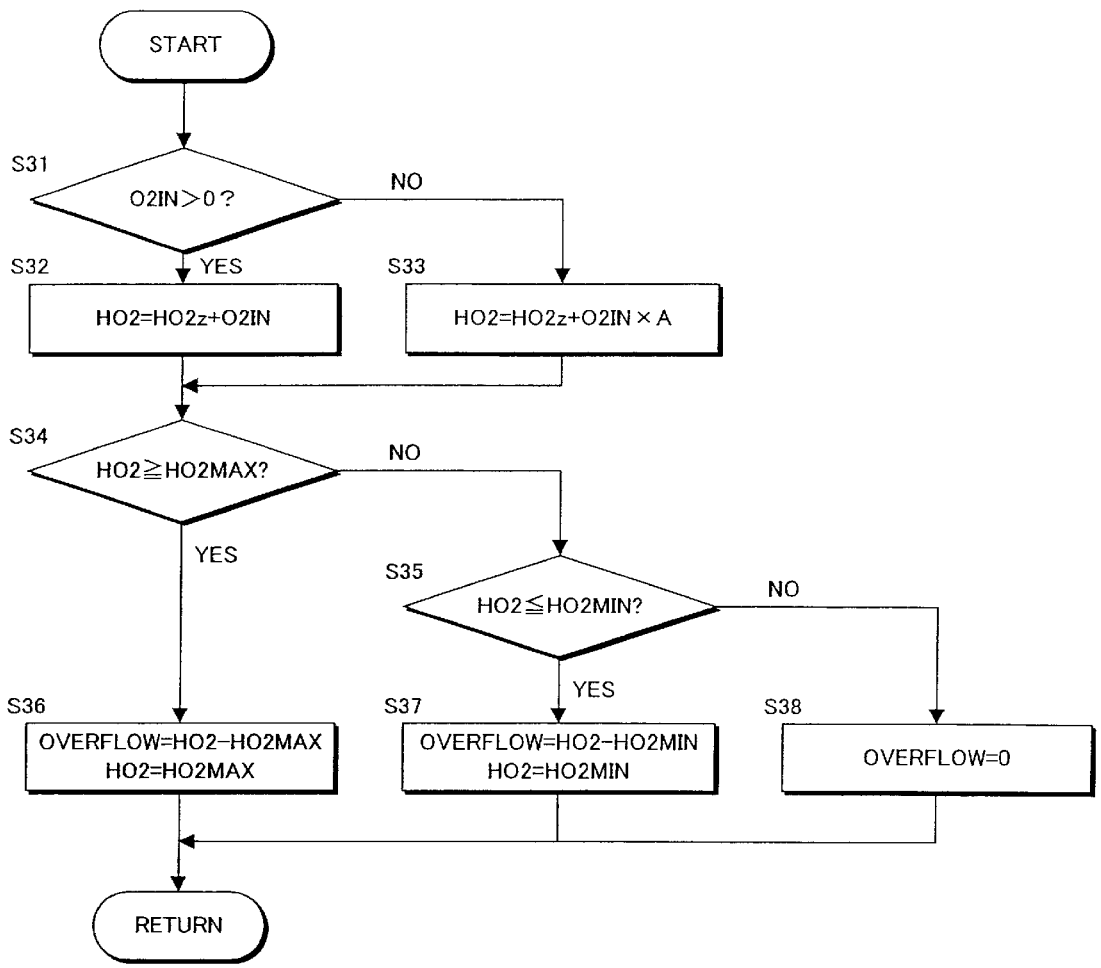
FIG. 6 is a flowchart showing a subroutine for computing the high speed component of the oxygen storage amount.

FIG. 6 shows a subroutine for computing the high speed component HO2 of the oxygen storage amount. In this subroutine, the high speed component HO2 is computed based on the oxygen excess/deficiency amount O2IN of the exhaust flowing into the catalyst 3 and the oxygen release rate A of the high speed component.

First, it is determined in step S31 whether or not the high speed component HO2 is being stored or released based on the oxygen excess/deficiency amount O2IN. When the air-fuel ratio of the exhaust flowing into the catalyst 3 is lean and the oxygen excess/deficiency amount O2IN is larger than zero, it is determined that the high speed component HO2 is being stored, the routine proceeds to step S32, and the high speed component HO2 is computed from the following equation (1):

$$HO2 = HO2z + O2IN \quad (1)$$

where:

$O2IN = FO2 \times Q \times t$, and $HO2z$ = value of high speed component HO2 determined on the immediately preceding run.

On the other hand, when it is determined that the oxygen excess/deficiency amount O2IN is less than zero and the high speed component is being released, the routine proceeds to step S33, and the high speed component HO2 is computed from the following equation (2):

$$HO2 = HO2z + O2IN \times A \quad (2)$$

where: A=oxygen release rate of high speed component HO2.

In steps S34, S35, it is determined whether or not the computed HO2 exceeds the maximum capacity HO2MAX of the high speed component, or whether it is not less than a minimum capacity HO2MIN. Here, the minimum capacity HO2MIN is set as zero.

When the high speed component HO2 exceeds the maximum capacity HO2MAX, the routine proceeds to step S36, and the overflow oxygen amount (excess amount) OVERFLOW flowing out without being stored as the high speed component HO2 is computed from the following equation (3):

$$OVERFLOW = HO2 - HO2MAX \quad (3)$$

Here, the high speed component HO2 is limited by the maximum capacity HO2MAX.

When the high speed component HO2 is less than the minimum capacity HO2MIN, the routine proceeds to step S37, and the overflow oxygen amount (deficiency amount) OVERFLOW which was not stored as the high speed component HO2 is computed by the following equation (4):

$$OVERFLOW = HO2 - HO2MIN \quad (4)$$

The high speed component HO2 is also limited by the minimum capacity HO2MIN.

When the high speed component HO2 lies between the maximum capacity HO2MAX and minimum capacity HO2MIN, the oxygen excess/deficiency amount O2IN of the exhaust flowing into the catalyst 3 is all stored as the high speed component HO2, the routine proceeds to step S38, and zero is set for the overflow oxygen amount OVERFLOW.

When the high speed component HO2 is greater than the maximum capacity HO2MAX or less than the minimum capacity HO2MIN, the overflow oxygen amount OVERFLOW which has overflowed from the high speed component HO2 is stored as the low speed component LO2.

Figure 7:
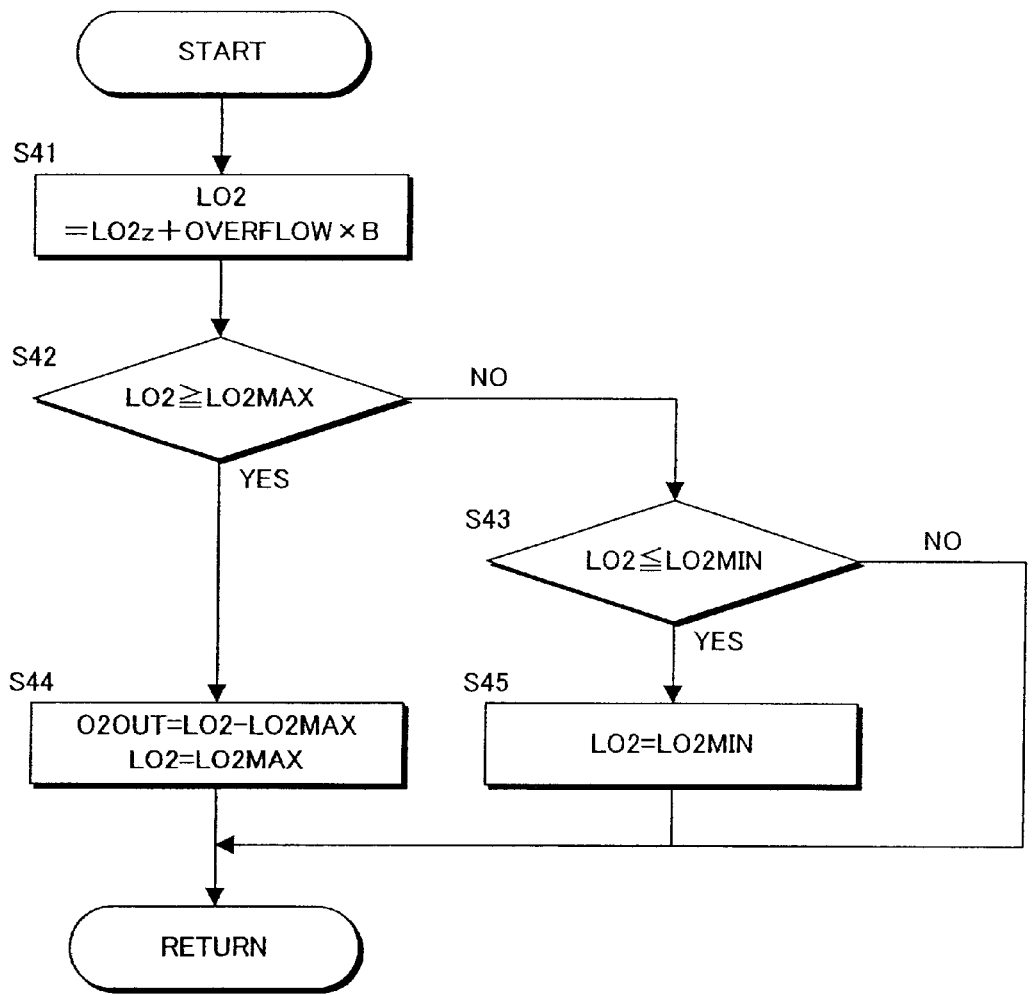
FIG. 7 is a flowchart showing a subroutine for computing a low speed component of the oxygen storage amount.

FIG. 7 shows a subroutine for computing the low speed component LO2 of the oxygen storage amount. In this subroutine, the low speed component LO2 is computed based on the overflow oxygen amount OVERFLOW which has overflowed from the high speed component HO2.

According to this, in step S41, the low speed component LO2 is computed by the following equation (5):

$$LO2 = LO2z + OVERFLOW \times B \quad (5)$$

where LO2z=immediately preceding value of low speed component LO2, and B=oxygen storage/release rate for low speed component.

Here, the oxygen storage/release rate B for the low speed component is set to a positive value less than 1, but the real storage/release rate is affected by the catalyst temperature TCAT and the low speed component LO2, so the storage rate and release rate can be set to vary independently. In this case, when the overflow oxygen amount OVERFLOW is positive, oxygen is in excess, and the oxygen storage rate at this time is set, for example, to a value which increases with the increase in catalyst temperature TCAT or the smaller the low speed component LO2. Also, when the overflow oxygen amount OVERFLOW is negative, oxygen is deficient, and the oxygen release rate at this time may, for example, be set to a value which increases as the catalyst temperature TCAT increases or increases as the low speed component LO2 increases.

In steps S42, S43, in the same way as when the high speed component HO2 is computed, it is determined whether or not the computed low speed component LO2 has exceeded a maximum capacity LO2MAX or is less than a minimum capacity LO2MIN. Here, the minimum capacity LO2MIN is set as zero.

When the maximum capacity LO2MAX is exceeded, the routine proceeds to step S44, an oxygen excess/deficiency amount O2OUT which has overflowed from the low speed component LO2 is computed from the following equation (6):

$$O2OUT = LO2 - LO2MAX \quad (6)$$

and the low speed component LO2 is limited by the maximum capacity LO2MAX. The oxygen excess/deficiency amount O2OUT flows out downstream of the catalyst 3.

On the other hand, when the low speed component LO2 is less than the minimum capacity, the routine proceeds to step S45, and the low speed component LO2 is limited by the minimum capacity LO2MIN.

Next, the resetting of the computed value of the oxygen storage amount performed by the controller 6 will be described. By resetting the computed value of the oxygen storage amount, computational errors which have accumulated are eliminated, and the computational precision of the oxygen storage amount can be improved.

Figure 8:
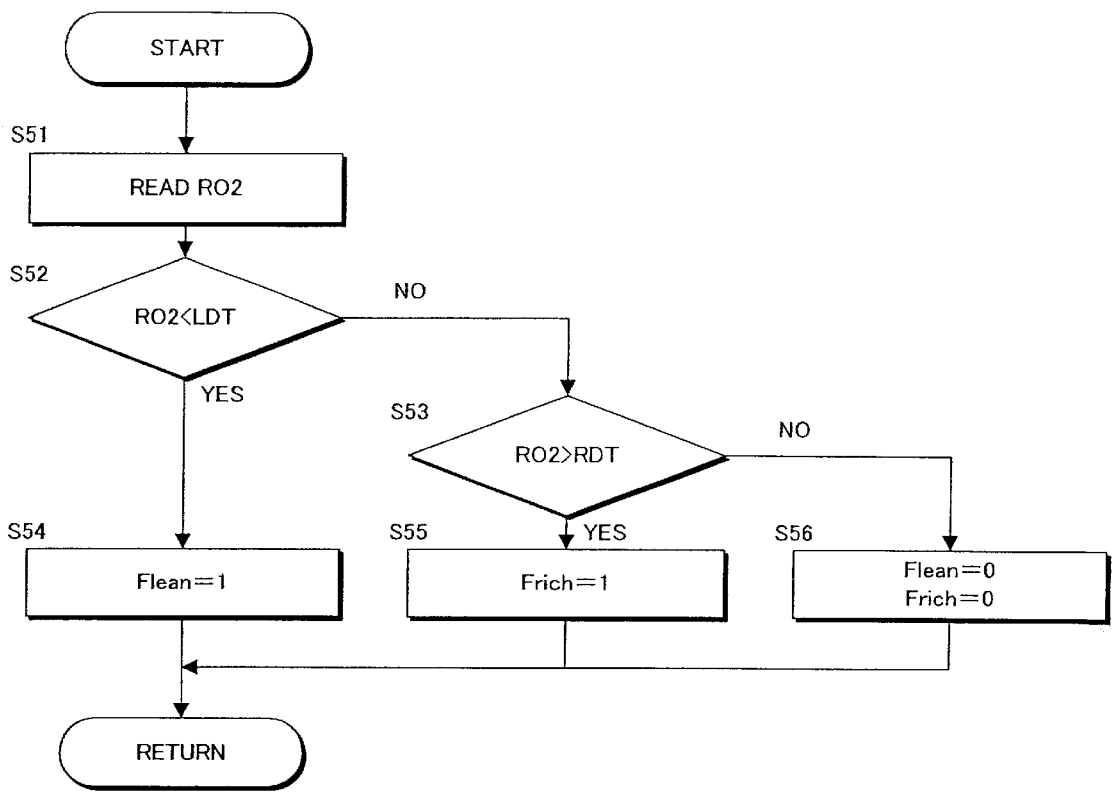
FIG. 8 is a flowchart showing a routine for determining a reset condition.

FIG. 8 shows a routine for determining if conditions suitable for a reset are in existence. More specifically, this routine determines whether or not conditions for resetting the oxygen storage amount (high speed component HO2 and low speed component LO2) hold from the oxygen concentration downstream of the catalyst 3, and which sets a flag Frich and a flag Flean.

First, in step S51, the output of the rear oxygen sensor 5 which detects the oxygen concentration downstream of the catalyst 3 is read. Subsequently, in steps S52, S53, the rear oxygen sensor output RO2 is compared with a lean determining threshold LDT, and with a rich determining threshold RDT.

When the rear oxygen sensor output RO2 is less than the lean determining threshold LDT, the routine proceeds to step S54, and the flag Flean is set to "1" showing that lean reset conditions for the oxygen storage amount hold. When the rear oxygen sensor output RO2 exceeds the rich determining threshold RDT, the routine proceeds to step S55, and the flag Frich is set to "1" showing that rich reset conditions for the oxygen storage amount hold.

When the rear oxygen sensor output RO2 lies between the lean determining threshold LDT and rich determining threshold RDT, the routine proceeds to step S56, and the flags Flean and Frich are set to "0" showing that the lean reset condition and rich reset condition do not hold.

Figure 9:
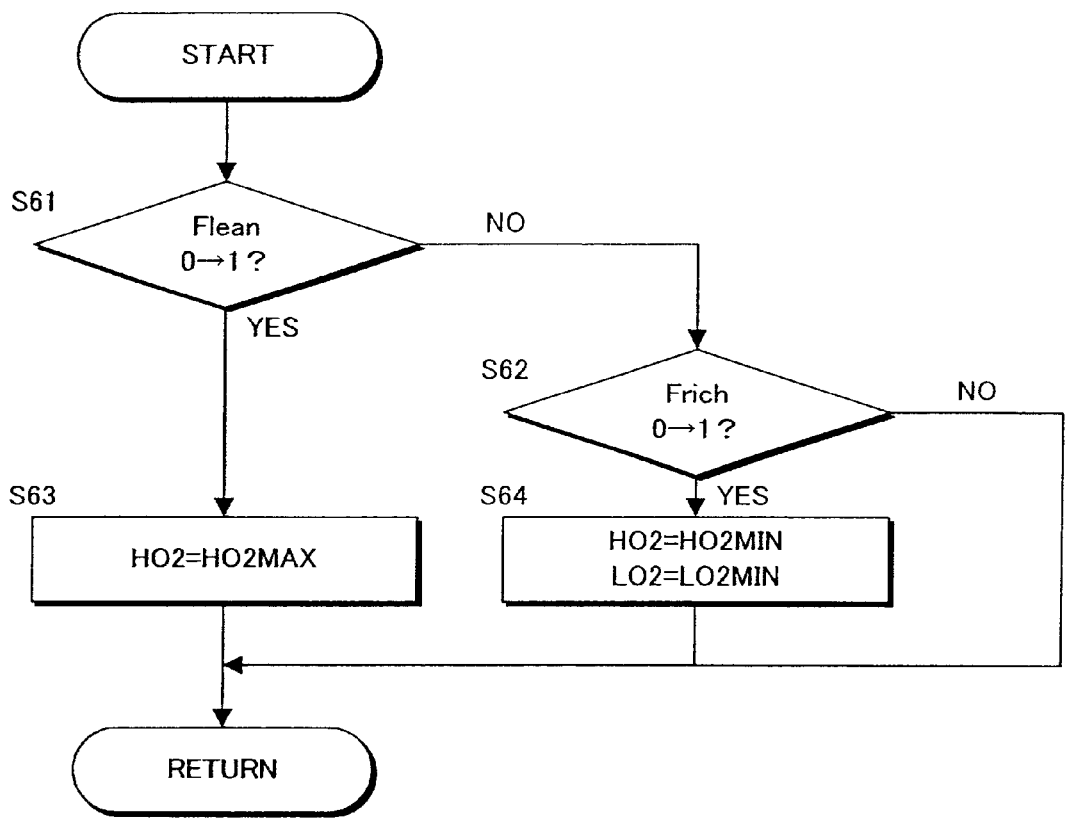
FIG. 9 is a flowchart showing a routine for performing reset of a computed value of the oxygen storage amount.

FIG. 9 shows a routine for resetting the oxygen storage amount.

According to this routine, steps S61, S62 determine whether or not lean reset conditions or rich reset conditions hold based on the variation of the values of the flags Flean and Frich.

When the flag Flean changes from "0" to "1", and it is determined that lean reset conditions hold, the routine proceeds to step S63, and the high speed component HO2 of the oxygen storage amount is reset to the maximum capacity HO2MAX. At this time, resetting of the low speed component LO2 is not performed. On the other hand, when the flag Frich changes from "0" to "1", and it is determined that rich reset conditions hold, the routine proceeds to step S64, and the high speed component HO2 and low speed component LO2 of the oxygen storage amount are respectively reset to the minimum capacities HO2MIN, LO2MIN.

The reason why resetting is performed under these conditions is that as the oxygen storage rate of the low speed component LO2 is slow, oxygen overflows downstream of the catalyst 3 even if the low speed component LO2 has not reached maximum capacity when the high speed component HO2 reaches maximum capacity, and when the exhaust air-fuel ratio downstream of the catalyst becomes lean, it may be considered that at least the high speed component HO2 has reached maximum capacity.

When the exhaust air-fuel ratio downstream of the catalyst becomes rich, as the oxygen is not released from the low speed component LO2 which releases oxygen slowly, it may be considered that the high speed component HO2 and low speed component, LO2 are both are at their respective minimum values.

Next, the air-fuel ratio control performed by the controller 6 (oxygen storage amount constant control) will be described.

Figure 10:
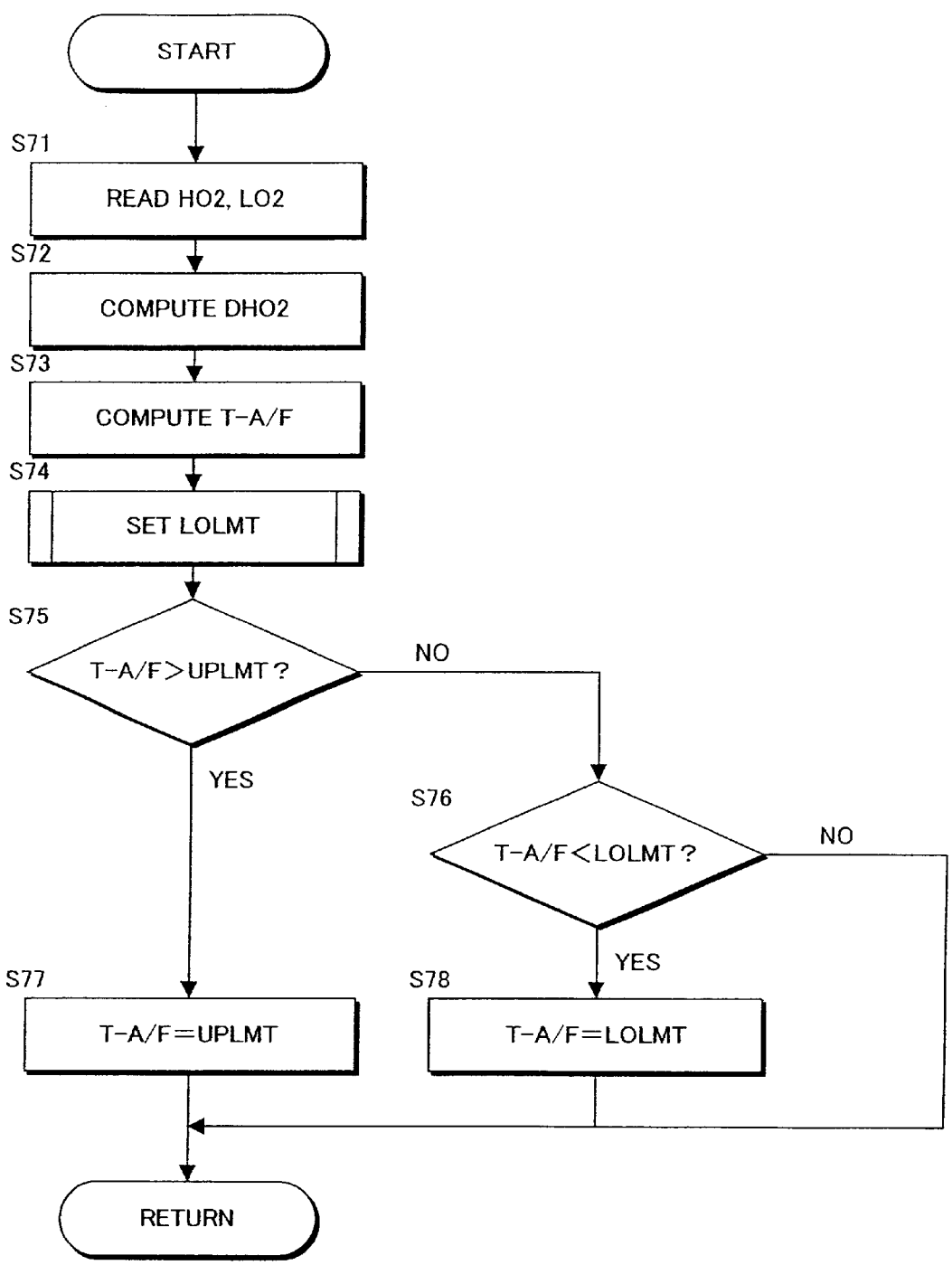
FIG. 10 is a flowchart showing a routine for computing a target air-fuel ratio based on the oxygen storage amount.

FIG. 10 shows a routine for computing a target air-fuel ratio based on the oxygen storage amount.

First, in step S71, the high speed component HO2 and low speed component LO2 of the present oxygen storage amount is read. In step S72, a deviation DHO2 (=oxygen excess/deficiency amount required by catalyst 3) between the current high speed component HO2 and a target value TGHO2 of the high speed component, is computed. The target value TGHO2 of the high speed component is set to, for example, half of the maximum capacity HO2MAX of the high speed component.

In step S73, the computed deviation DHO2 is converted to an air-fuel ratio equivalent value, and a target air-fuel ratio T-A/F of the engine 1 is set. In step S74, a subroutine which sets a lower limiter LOLMT of the target air-fuel ratio T-A/F depending on the low speed component LO2 according to the running conditions. This will be described in detail later.

In steps S75, S76, the target air-fuel ratio T-A/F is compared with an upper limiter UPLMT and lower limiter LOLMT. When the target air-fuel ratio T-A/F exceeds the upper limiter UPLMT (for example, 15.0), the routine proceeds to step S77 and the target air-fuel ratio T-A/F is limited by the upper limiter UPLMT. When it is less than the lower limiter LOLMT, the target air-fuel ratio T-A/F is limited by the lower limiter LOLMT.

Therefore, according to this routine, when the high speed component HO2 is less than the target value TGHO2, the target air-fuel ratio of the engine 1 is set to lean and the high speed component HO2 is increased, and when it exceeds the target value TGHO2, the target air-fuel ratio of the engine 1 is set to rich and the high speed component HO2 is decreased, but the target air-fuel ratio is limited so that it does not exceed the upper limiter UPLMT or lower limiter LOLMT. In this way, impairment of drivability and fuel cost-performance is prevented.

Figure 11:
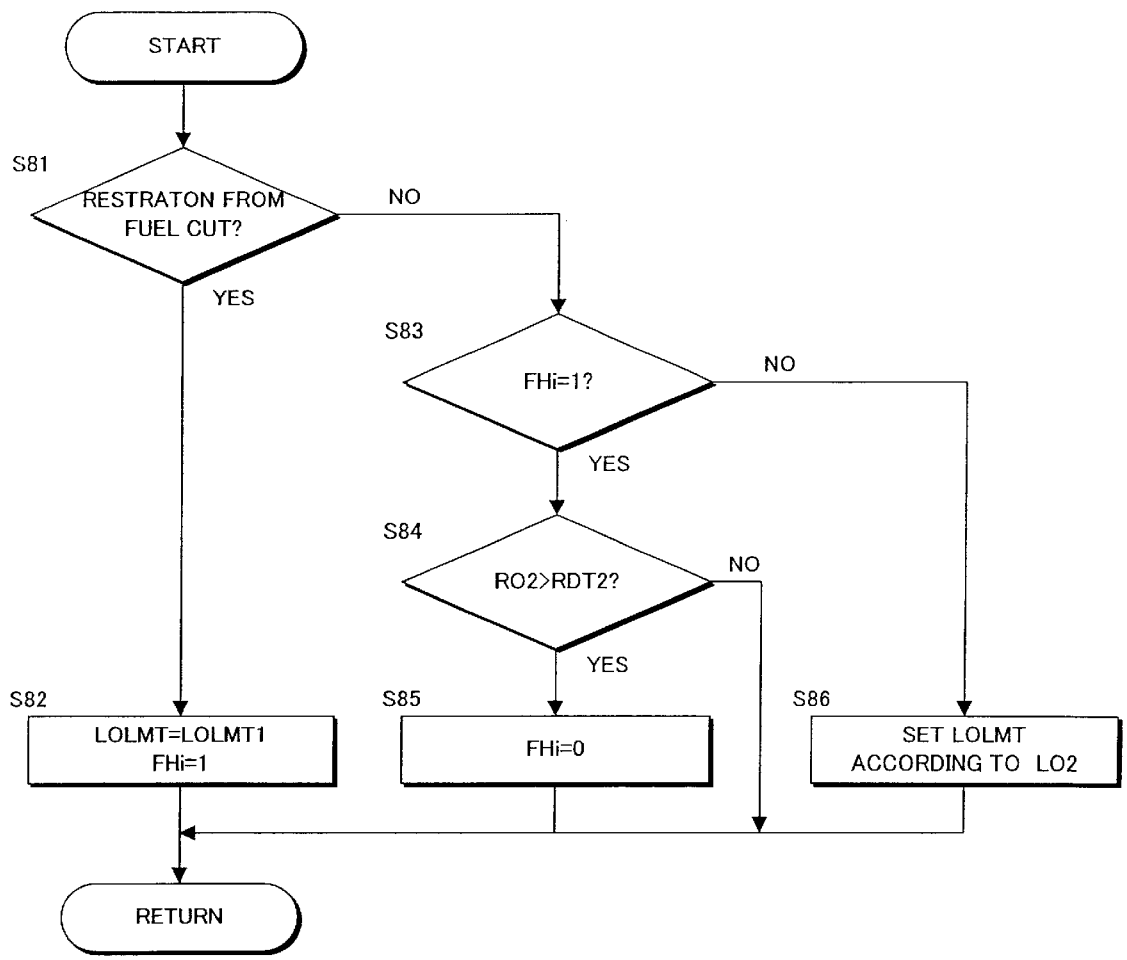
FIG. 11 is a flowchart showing a routine for computing a lower limiter of the target air-fuel ratio.

The lower limiter LOLMT of the target air-fuel ratio at this time is set according to the engine running state and the low speed component LO2. This point will be described referring to FIG. 11. The routine shown in FIG. 11 is performed as a subroutine (step S74) of FIG. 10 as described above.

First, in step S81, it is determined whether or not fuel cut of the engine 1 was performed due to deceleration, etc. and a restoration from fuel cut occurred. The presence or absence of fuel cut is determined by monitoring a signal from the fuel control system, or by detecting a fuel cut condition. The fuel cut due to deceleration is performed, for example, when the engine rotation speed is greater than a reference value, the accelerator pedal is not depressed, and the gear position of the transmission is not neutral. A fuel cut which was started on these conditions is terminated when the engine rotation speed has become less than a lower reference value, or the accelerator pedal is depressed. Therefore, by monitoring these conditions, a restoration from a fuel cut during deceleration can be determined.

When it is determined that there is a restoration from fuel cut in step S81, the routine proceeds to step S82. In step S82, a limiter value LOLMT1 which is more on the rich side is set as a new lower limiter LOLMT, and a flag FHi is set to "1" showing that the available air-fuel ratio has been expanded in the rich direction due to the modification of the lower limiter LOLMT. In the initial state, the flag FHi is "0". The lower limiter LOLMT is for example usually set to around 14.4, whereas the limiter value LOLMT1 is set to around 14.0.

On the other hand, when it is determined in step S81 that restoration from fuel cut did not occur, the routine proceeds to step S83, and it is determined whether not the flag FHi is "1". When the flag FHi is "1" which means that the available air-fuel ratio is expanding as described above, the routine proceeds to step S84.

In step S84, it is determined whether the rear oxygen sensor output RO2 is smaller than a rich determining threshold RDT2. When it is smaller than the rich determining threshold RDT2, the routine is terminated, the lower limiter LOLMT (=LOLMT1) set in step S82 is maintained, and the expansion of the available air-fuel ratio continues. On the other hand, when the rear oxygen sensor output RO2 is larger than the rich determining threshold RDT2, it is determined that the oxygen storage amount of the catalyst 3 has effectively returned to the target amount, so the flag FHi is set to "0" to terminate expansion processing of the available air-fuel ratio in step S85. It may be noted that, when the calculated oxygen storage amount of the catalyst 3 has reached a predetermined target value, the lower limiter may be returned to its original value which is according to the low speed component LO2 as described later.

When the running state of the engine 1 is free of fuel cut (viz., is "no fuel cut"), or when the above expansion processing of the available air-fuel ratio is terminated, the flag FHi is "0". In this case, the routine proceeds from step S83 to step 86, and the lower limiter LOLMT of the target air-fuel ratio is set according to the low speed component LO2 of the oxygen storage amount. Specifically, the lower limiter LOLMT is, for example, set by looking up a predetermined table. While the low speed component LO2 is in the range from zero to a predetermined amount, it is set to a value slightly less than the stoichiometric air-fuel ratio (e.g., 14.4), and when the low speed component is greater than the predetermined amount, it is set to a still smaller value (e.g., 12.0). In this way, when the low speed component LO2 is large and the release rate of the high speed component HO2 is falling, the lower limiter LOLMT is changed to the rich side so as to induce the high speed component HO2 to rapidly converge on the target value TGHO2.

Here, the lower limiter LOLMT is changed to the rich side when a restoration from fuel cut is detected (step S81). However, this change to the rich side may be induced when the rear oxygen sensor output RO2 becomes smaller than a lean determining threshold LDT2, i.e., when the air fuel ratio of the exhaust flowing out of the catalyst has become leaner than a predetermined value, assuming that the engine 1 has run under the lean air-fuel ratio.

Next, the overall action performed by the above control will be described.

In the exhaust purification arrangement according to this invention, computation of the oxygen storage amount of the catalyst 3 begins when the engine 1 starts, and the air-fuel ratio of the engine 1 is controlled so that the oxygen storage amount of the catalyst 3 is constant with a view to maintaining the conversion efficiency of the catalyst 3 at a maximum.

The oxygen storage amount of the catalyst 3 is estimated based on the air-fuel ratio of the exhaust gas flowing into the catalyst 3 and the intake air amount of the engine 1, and computation of the oxygen storage amount is divided into the high speed component HO2 and low speed component LO2 according to the actual characteristics. Specifically, the computation is performed assuming that when oxygen is stored, oxygen is preferentially stored as the high speed component HO2, and oxygen begins to be stored as the low speed component LO2 when oxygen can no longer be stored as the high speed component HO2. The computation also assumes that when oxygen is released, and the ratio (LO2/HO2) of the low speed component LO2 and high speed component HO2 is less than the fixed proportion, oxygen is preferentially released from the high speed component HO2, and when the ratio LO2/HO2 reaches the fixed proportion, oxygen is released from both the low speed component LO2 and high speed component HO2 to maintain this ratio LO2/HO2.

When the high speed component HO2 of the computed oxygen storage amount is larger than the target value, the controller 6 decreases the high speed component by controlling the air-fuel ratio of the engine 1 to become rich, and when it is less than the target value, the high speed component HO2 is converged to the target value TGHO2 by changing the air-fuel ratio to become lean and increasing the high speed component HO2.

At this time, as the target air-fuel ratio is limited by the upper limiter UPLMT and the lower limiter LOLMT, an excessively large variation of the air-fuel ratio to make the high speed component HO2 converge on the target value TGHO2 is prevented and impairment of drivability or fuel-cost-performance are prevented. However, if the oxygen storage amount were suddenly increased due to fuel cut control during deceleration, such as described above, the NOx discharge amount would increase if this were not rapidly returned to an appropriate value, so after these lean running conditions, the lower limiter LOLMT is changed to a richer value than usual. Hence, the high speed component HO2 of the oxygen storage amount can be rapidly returned to the target value TGHO2, and discharge of NOx following a fuel cut or the like which induces lean conditions, can be suppressed to the minimum.

Figure 12:
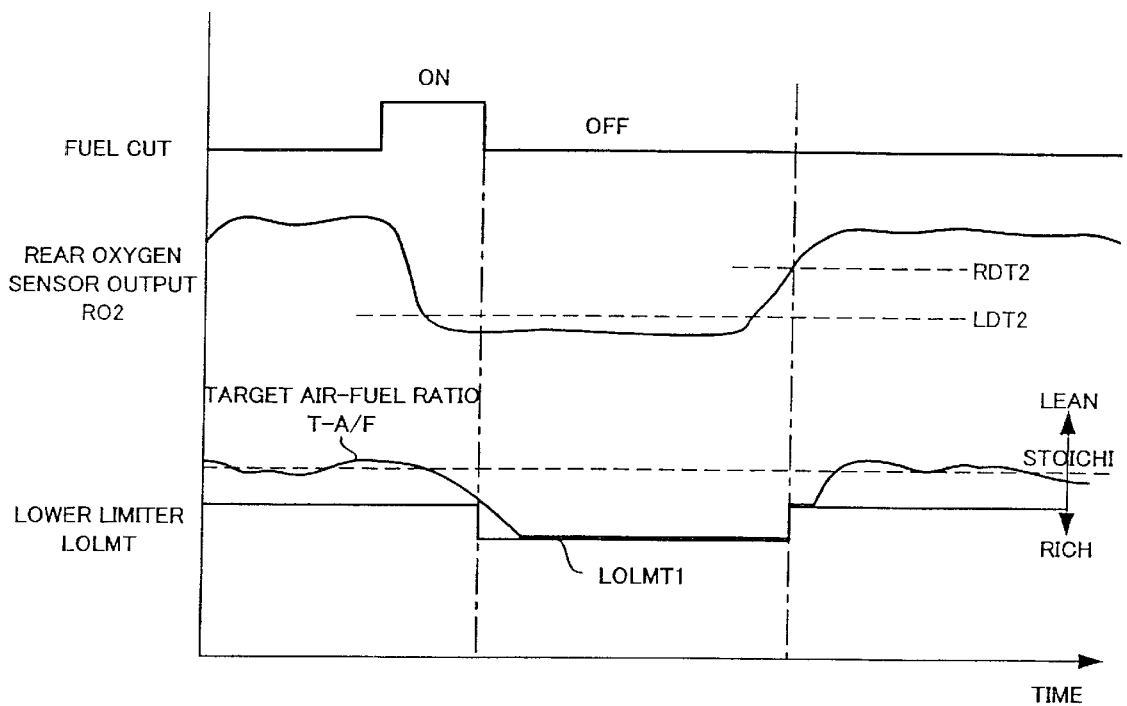
FIG. 12 shows the situation where the lower limiter is modified after fuel cut.

FIG. 12 shows the situation where the lower limiter LOLMT is modified after fuel cut. When the low speed component LO2 is large, oxygen is released also from the low speed component LO2, and the release of oxygen from the high speed component HO2 becomes more difficult. As a result, if the air-fuel ratio cannot be changed to a considerably richer value by the lower limiter, it will take time for the high speed component HO2 to converge on the target value TGHO2. However, according to this invention, when the low speed component LO2 is large, the lower limiter LOLMT of the target air-fuel ratio is corrected to the rich side, so the air-fuel ratio can be largely shifted to a rich setting as necessary, and the high speed component HO2 can be induced to rapidly converge back to the target value TGHO2.

The entire contents of Japanese Patent Application P2000-49178 (filed Feb. 25, 2000) which forms the basis for this application and on which the claim for priority are based, and are incorporated herein by reference.

Although the invention has been described above by reference to a limited number of embodiments, the invention is not so limited and modifications and variations of the embodiments described above will be self evident to those skilled in the art, in light of the above teachings. The scope of the invention is defined with reference to the following claims.

INDUSTRIAL APPLICABILITY

As described above, the exhaust purification arrangement of this invention is useful as an exhaust purification arrangement for an engine system having a catalyst which stores oxygen. As a storage amount/component of the catalyst, which can be rapidly controlled to a target amount, is relied upon for control purposes, it is possible to simultaneously prevent excessively large variations in the engine air-fuel ratio, and to maintain the purification performance of the exhaust catalyst at a desirably high level.

What is claimed is:

1. An exhaust purification arrangement for an engine, comprising:
   a catalyst provided in an exhaust passage of the engine, said catalyst containing a material which stores oxygen in a form of a first amount which is rapidly adsorbed and released from the material and which stores oxygen in a form of a second amount which is slowly adsorbed and released from the material;
   a front sensor which detects an air-fuel ratio of exhaust flowing into the catalyst; and
   a processor programmed to:
      compute the first amount of oxygen stored in the catalyst, based on the detected exhaust air-fuel ratio;
      compute a target air-fuel ratio to be supplied to the engine so that an amount of oxygen in the exhaust maintains the first amount of oxygen at a predetermined target value;
      limit the target air-fuel ratio to a lower limiter when the computed target air-fuel ratio is less than the lower limiter; and
      control an air-fuel ratio of the engine based on the target air-fuel ratio after limitation.

2. An exhaust purification arrangement as defined in claim 1, wherein the processor is further programmed to lower the lower limiter to a rich side after the engine has run under a predetermined lean air-fuel ratio.

3. An exhaust purification arrangement as defined in claim 2, wherein the predetermined lean air-fuel ratio is produced when the engine is running under conditions wherein a supply of fuel to at least one of a plurality of cylinders of the engine has been cut-off.

4. An exhaust purification arrangement as defined in claim 1, further comprising a rear sensor which detects whether the air-fuel ratio of the exhaust flowing out of the catalyst is richer or leaner than the stoichiometric air-fuel ratio, and wherein the processor is further programmed to lower the lower limiter from a first value to a second value on a rich side when the exhaust flowing out of the catalyst has become leaner than a predetermined threshold.

5. An exhaust purification arrangement as defined in claim 4, wherein the processor is further programmed to raise the lower limiter back to the first value when the exhaust flowing out of the catalyst becomes richer than a rich determining threshold.

6. An exhaust purification arrangement as defined in claim 4, wherein the processor is further programmed to raise the lower limiter to the first value when the oxygen storage amount of the catalyst is determined to be a predetermined amount.

7. An exhaust purification arrangement as defined in claim 1, wherein the processor is further programmed to compute the first amount and the second amount separately.

8. An exhaust purification arrangement as defined in claim 7, wherein the processor is further programmed to lower the lower limiter to a rich side when the computed second amount is larger than a predetermined amount.

9. An exhaust purification arrangement according to claim 1, wherein the catalyst contains a first material which stores the first amount of oxygen and a second material which stores the second amount of oxygen.

10. An exhaust purification arrangement according to claim 9, wherein the first material is a noble metal and the second material is cerium oxide ($CeO_2$).

11. An exhaust purification arrangement according to claim 9, wherein the first material comprises platinum (Pt).

12. An exhaust purification arrangement according to claim 9, wherein the catalyst is a three-way catalyst which purifies nitrogen oxides (NOx), CO and hydrocarbon(HC) in exhaust gas from the engine.

13. An exhaust purification arrangement for an engine, comprising:
   a catalyst provided in an exhaust passage of the engine;
   a front sensor which detects an air-fuel ratio of exhaust flowing into the catalyst; and
   a processor programmed to:
      estimate a first amount of oxygen stored in the catalyst, the first amount being estimated to change at a first rate;
      estimate a second amount of oxygen stored in the catalyst;
      estimate the first rate based on an excess oxygen concentration and a relationship between the first amount and the second amount; and
      compute a target air-fuel ratio to be supplied to the engine so that an amount of oxygen in the exhaust maintains the first amount of oxygen in the catalyst at a predetermined target value.

14. An exhaust purification arrangement for an engine, comprising:
   a catalyst provided in an exhaust passage of the engine, said catalyst containing a material which stores oxygen in a form of a first amount which is rapidly adsorbed and released from the material and which stores oxygen in a form of a second amount which is slowly adsorbed and released from the material;
   a front sensor which detects an air-fuel ratio of exhaust flowing into the catalyst; and
   a processor programmed to:
      compute the first amount of oxygen stored in the catalyst, based on the detected exhaust air-fuel ratio;
      compute a target air-fuel ratio to be supplied to the engine so that an amount of oxygen in the exhaust maintains the first amount of oxygen at a predetermined target value;
      limit the target air-fuel ratio to an upper limiter when the computed target air-fuel ratio exceeds the upper limiter; and
      control an air-fuel ratio of the engine based on the target air-fuel ratio after limitation.

15. An exhaust purification arrangement for an engine, comprising:
   a catalyst provided in an exhaust passage of the engine, said catalyst containing a material which stores oxygen in a form of a first amount which is rapidly adsorbed and released from the material and which stores oxygen in a form of a second amount which is slowly adsorbed and released from the material;
   a front sensor which detects an air-fuel ratio of exhaust flowing into the catalyst; and
   a processor programmed to:
      compute the first amount of oxygen stored in the catalyst, based on the detected exhaust air-fuel ratio;
      compute a target air-fuel ratio to be supplied to the engine so that an amount of oxygen in the exhaust maintains the first amount of oxygen at a predetermined target value; and
      wherein a total capacity of the catalyst is equal to or larger than 1.1 times a total displacement of engine cylinders of the engine.

16. An exhaust purification arrangement for an engine, comprising:
   a catalyst provided in an exhaust passage of the engine, said catalyst including a material which stores oxygen in a form of a high speed component which is rapidly adsorbed and released from the material and which stores oxygen in a form of a low speed component which is slowly adsorbed and released from the material;
   means for detecting an air-fuel ratio of exhaust flowing into the catalyst;
   means for computing an oxygen storage amount of the catalyst based on the detected exhaust air-fuel ratio;
   means for computing a target air-fuel ratio of the engine so that the high speed component of the oxygen storage amount is maintained at a predetermined target value;
   means for limiting the target air-fuel ratio to a lower limiter when the computed target air-fuel ratio is less than the lower limiter;
   means for lowering the lower limiter to a rich side after the engine has run under a predetermined lean air-fuel ratio; and
   means for controlling an air-fuel ratio of the engine based on the target air-fuel ratio after limitation.

17. A method of controlling an air-fuel ratio of an engine having a catalytic converter within an exhaust passage connected to the engine, comprising the steps of:
   determining, based on a sensed engine operating parameter, the mass flow rate of oxygen flowing into the catalytic converter;
   estimating an oxygen storage amount stored on a first material which adsorbs and releases oxygen quickly and a second material which stores and releases oxygen more slowly than the first material, by integrating the mass flow rate over a predetermined period of time;
   computing a difference between the estimated oxygen storage amount stored on the first material and target oxygen storage level for the first material;
   determining a change in an air-fuel ratio value of exhaust gas which is supplied to the catalytic converter which will adjust the amount of oxygen stored on the first material to the target oxygen storage level of the first material;
   determining a maximum value for the air-fuel ratio change;
   limiting the change in air-fuel ratio to a value less than the maximum value.

18. A method of controlling an air-fuel ratio of an engine as set forth in claim 17, further comprising the steps of:
   determining whether or not the first material has been saturated with oxygen; and
   increasing the maximum value responsive to said determination.

19. A method of controlling an air-fuel ratio of an atmosphere in a catalytic converter which is operatively connected with an internal combustion engine, comprising steps of:
   storing oxygen on a first material in the catalytic converter which adsorbs and releases oxygen rapidly;
   storing oxygen on a second material in the catalytic converter which adsorbs and releases oxygen more slowly than the first material; and
   controlling the air-fuel ratio of the atmosphere in the catalytic converter to control an amount of oxygen which is adsorbed on the first material to a predetermined target amount which is less than a maximum amount of oxygen which can be adsorbed onto the first material;

wherein said step of controlling the air-fuel ratio includes:
controlling the air-fuel ratio to within upper and lower air-fuel ratio limits;
determining if the first material is saturated with oxygen; and
temporarily reducing the lower air-fuel ratio limit to enrich the air-fuel ratio to rapidly lower the amount of oxygen stored in the first material toward the target amount.

20. An arrangement for controlling an air-fuel ratio of an atmosphere in a catalytic converter which is operatively connected with an internal combustion engine, comprising:
a first material disposed in the catalytic converter which adsorbs and releases oxygen rapidly;
a second material disposed in the catalytic converter which adsorbs and releases oxygen more slowly than the first material; and
control arrangement for controlling the air-fuel ratio of the atmosphere in the catalytic converter to adjust an amount of oxygen which is adsorbed on the first material to a target amount which is between a maximum and a minimum amount of oxygen which can be adsorbed onto the first material;
wherein the control arrangement:
controls the air-fuel ratio to within upper and lower air-fuel ratio limits;
determines if the first material is saturated with oxygen; and
temporarily reduces the lower air-fuel ratio limit to enrich the air-fuel ratio to rapidly lower the amount of oxygen stored in the first material toward the target amount.

* * * * *